United States Patent [19]

Brooks et al.

[11] Patent Number: 5,731,934
[45] Date of Patent: Mar. 24, 1998

[54] STACKED ARMS ASSEMBLED IN A HEAD DISK ASSEMBLY

[75] Inventors: Peter Everett Brooks; Gerald Daniel Malagrino, Jr.; Jeffrey Eric Mason, all of Rochester, Minn.

[73] Assignee: Western Digital Corporation, Irvine, Calif.

[21] Appl. No.: 834,646

[22] Filed: Apr. 10, 1997

[51] Int. Cl.$^6$ .............................. G11B 5/55; G11B 21/08
[52] U.S. Cl. ............................................................. 360/106
[58] Field of Search ............................... 360/106, 104

[56] References Cited

U.S. PATENT DOCUMENTS

| | | | |
|---|---|---|---|
| 4,967,296 | 10/1990 | Wiens et al. | 360/106 |
| 5,115,363 | 5/1992 | Khan et al. | 360/104 |
| 5,283,704 | 2/1994 | Reidenbach | 360/104 |
| 5,293,290 | 3/1994 | Owens et al. | 360/106 |
| 5,404,636 | 4/1995 | Stefansky et al. | 29/603 |
| 5,491,598 | 2/1996 | Stricklin et al. | 360/106 |
| 5,495,375 | 2/1996 | Baasch et al. | 360/104 |
| 5,512,725 | 4/1996 | Kelemen et al. | 219/121.64 |
| 5,631,789 | 5/1997 | Dion et al. | 360/106 |
| 5,650,896 | 7/1997 | Viskochil | 360/106 |

*Primary Examiner*—Robert S. Tupper
*Attorney, Agent, or Firm*—Leo J. Young; Milad G. Shara; W. Chris Kim

[57] ABSTRACT

A head disk assembly ("HDA") comprises an enclosure including a base and a pivot bearing cartridge having a shaft and a outer shell rotatable about the shaft. The outer shell has a cylindrical surface. The shaft is affixed to the base at a predetermined location. The enclosure has an internal volume with a limited height above the predetermined location. The cartridge has an elongated portion in the volume, the elongated portion having a height approximately equal to the limited height. The HDA further comprises a plurality of rotating disks, each having at least one recording surface. The HDA further comprises an arm stack comprising a plurality of arms, and a plurality of head gimbal assemblies. Each arm has a stacking portion and a cantilever portion. Each head gimbal assembly has one end attached to the cantilever portion of a respective arm and has an opposite end positioned adjacent a recording surface. Each stacking portion includes a first spring element and a second spring element, the spring elements being positioned to define a generally C-shaped bearing surface, the first spring element including a first compression-receiving surface and the second spring element including a second compression-receiving surface, each C-shaped bearing surface contacting a portion of the cylindrical surface. The HDA further comprises an overmolded coil assembly that includes a coil portion and an arcuate wall portion, the coil portion projecting perpendicularly from the wall portion and the wall portion including a first compression-supplying surface and second compression-supplying surface. The arcuate wall portion compressively locks the plurality of arms to the cartridge with each of a plurality of spaced-apart portions of the first compression-supplying surface compressively abutting the first compression-receiving surface of each arm in the arm stack, and each of a plurality of spaced-apart portions of the second compression-supplying surface compressively abutting the second compression-receiving surface of each arm in the arm stack. The arcuate wall portion has a height approximately equal to the height of the elongated portion of the cartridge, and the height of the arm stack is approximately equal to the limited height.

12 Claims, 5 Drawing Sheets

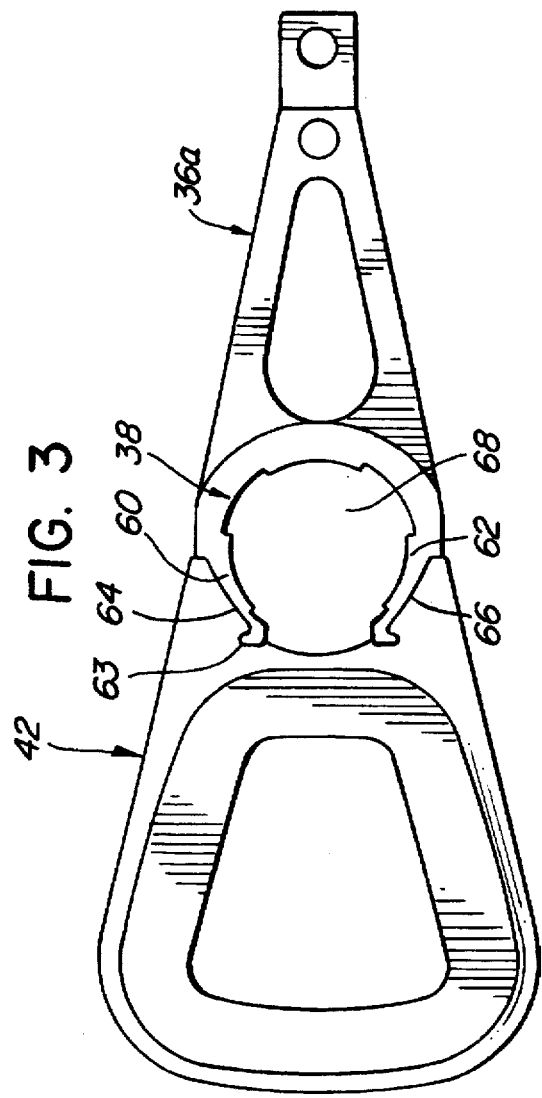
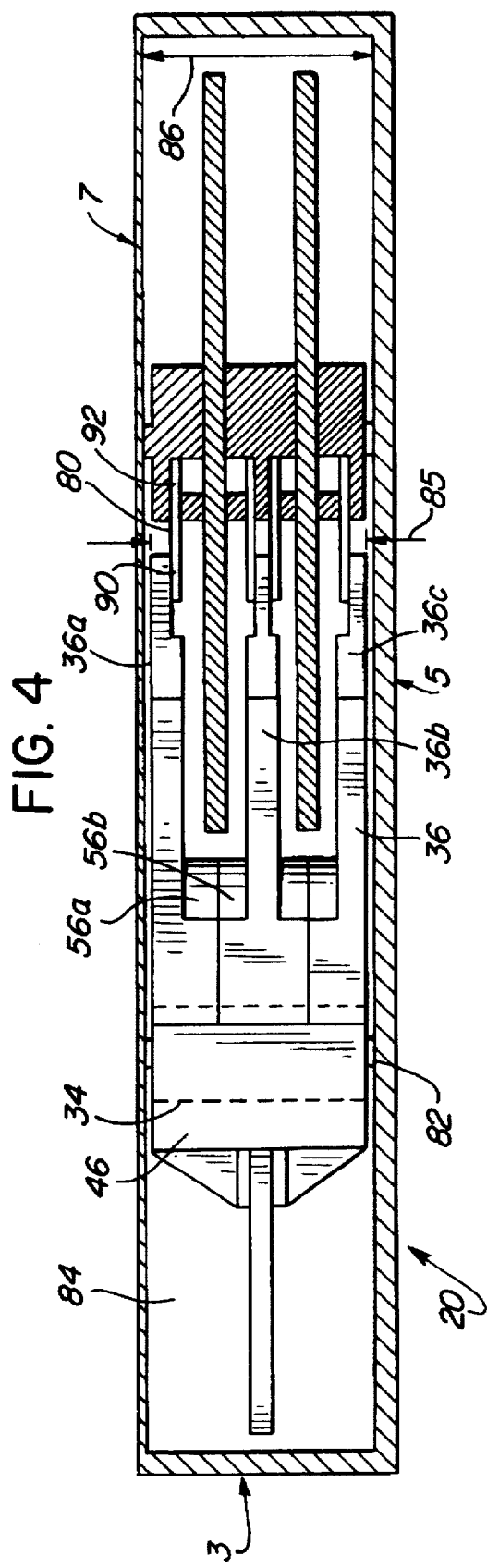

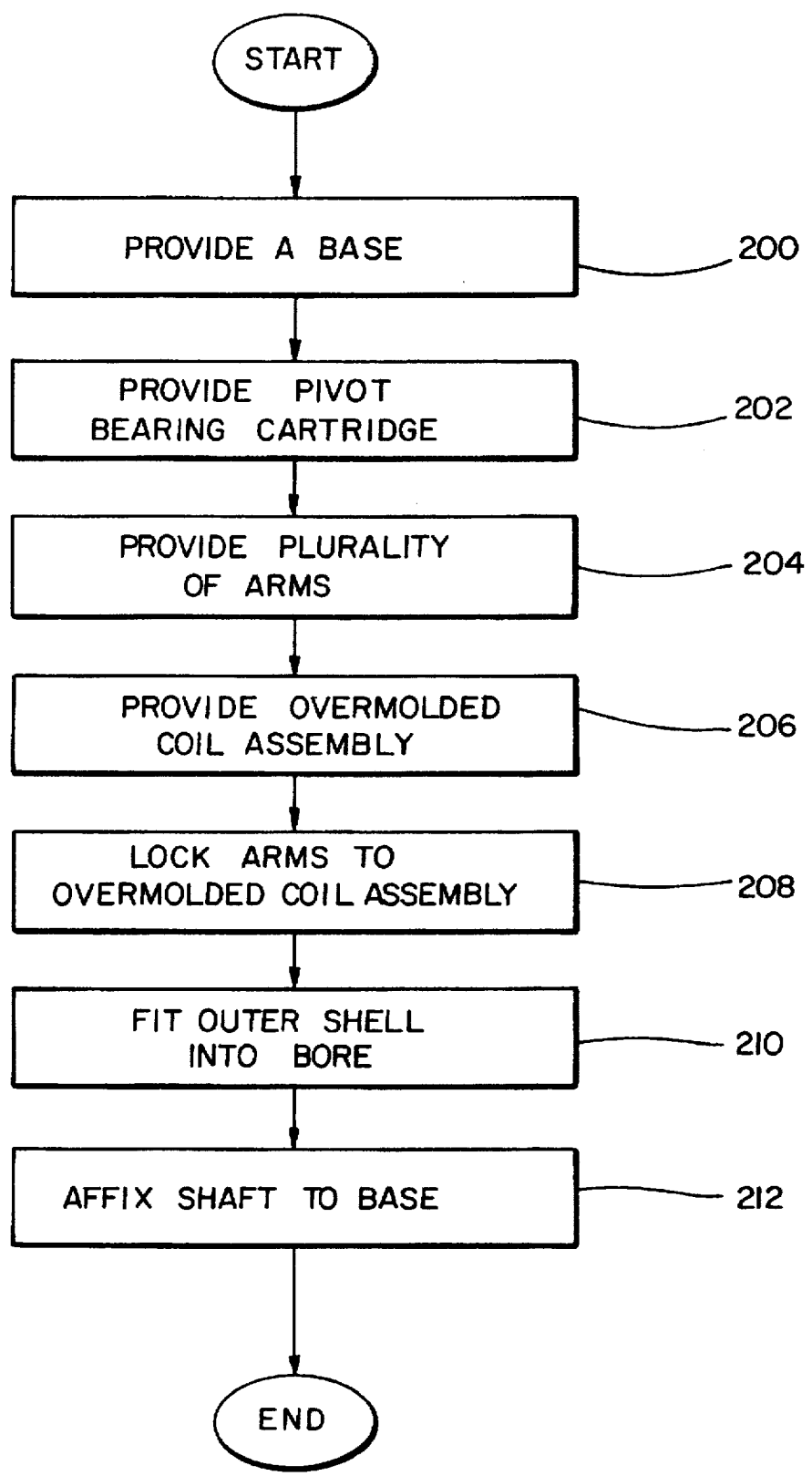

STACKED ARMS ASSEMBLED IN A HEAD DISK ASSEMBLY

BACKGROUND OF THE INVENTION

1. Field of the Invention

This invention relates to head disk assemblies for hard disk drives. More particularly, this invention relates to an arrangement in which stacked arms are assembled in a head disk assembly.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of arms projecting parallel to each other and perpendicular to the axis of the bore. The prefabricated head stack assembly also includes head gimbal assemblies that are supported by the arms. Each head gimbal assembly includes a load beam and a head supported by the load beam.

The pivot bearing cartridge includes an outer shell and an inner shaft with the inner shaft being attached to the base to define an axis of rotation for the rotary actuator. Generally, the cost of the components in, and the subassembly cost of, the rotary actuator arrangement is a significant portion of the overall cost to mass produce a drive. Accordingly, substantial research and development efforts have been expended in efforts to provide a low-cost rotary actuator arrangement, and numerous patents have issued relating to rotary actuator arrangements.

One of the patents relating to rotary actuator arrangements discloses an actuator arm assembly with self-locking arms; i.e., U.S. Pat. No. 5,495,375 to Baasch et al. In this patent, Baasch et al. describe a method of assembling actuator structure involving a pivot bearing cartridge, a cylindrical member, a coil assembly, and a plurality of arms. The cylindrical member has a bore through it. The bore receives the cartridge. The cylindrical member also includes a series of spaced-apart circumferential recesses. Each recess receives a respective one of the arms. The height of the cylindrical member exceeds the distance between the topmost surface of the top arm and the bottommost surface of the bottom arm. This excessive distance can cause a design problem in meeting requirements for low-height form factor drives with multiple disks.

Another method for stacking arms together to form an arm stack is disclosed in U.S. patent application Ser. No. 08/672,146, filed Jun. 27, 1996, titled "DISK DRIVE HEAD ACTUATOR FABRICATION SYSTEM EMPLOYING STANDARDIZED SELF-ALIGNING MODULAR COMPONENTS," and assigned to the same assignee as this invention.

SUMMARY OF THE INVENTION

This invention can be regarded as a method for assembling a head disk assembly. The method comprises providing a base, providing a pivot bearing cartridge, providing a plurality of arms, and providing an overmolded coil assembly. The pivot bearing cartridge has a shaft for defining an axis of revolution, and has an outer shell that is rotatable about the shaft. The outer shell has a cylindrical surface. Each arm has a stacking portion. Each stacking portion includes a first spring element and a second spring element. The spring elements are positioned to define a generally C-shaped bearing surface. The first spring element includes a first compression-receiving surface and the second spring element includes a second compression-receiving surface. The overmolded coil assembly includes a coil portion and an arcuate wall portion. The coil portion projects perpendicularly from the wall portion and the wall portion includes a first compression-supplying surface and second compression-supplying surface.

The method further comprises interlocking the plurality of arms and the overmolded coil assembly to form an arm stack having a bore by abutting each of a plurality of spaced-apart portions of the first compression-supplying surface with the first compression-receiving surface of each arm in the arm stack, and abutting each of a plurality of spaced-apart portions of the second compression-supplying surface with the second compression-receiving surface of each arm in the arm stack.

This invention can also be regarded as a head disk assembly. The head disk assembly comprises an enclosure including a base and a cover, a pivot bearing cartridge having a shaft for defining an axis of revolution, and having an outer shell that is rotatable about the shaft, the outer shell having a cylindrical surface. The shaft is affixed to the base at a predetermined location. The enclosure has an internal volume with a limited height above the predetermined location. The cartridge has an elongated portion in the volume. The head disk assembly further comprises a plurality of disks, and means for rotating the disks. Each disk has at least one recording surface.

The head disk assembly further comprises an arm stack comprising a plurality of arms. Each arm has a stacking portion and a cantilever portion. Each stacking portion includes a first spring element and a second spring element, the spring elements being positioned to define a generally C-shaped bearing surface, the first spring element including a first compression-receiving surface and the second spring element including a second compression-receiving surface, each C-shaped bearing surface contacting a portion of the cylindrical surface.

The head disk assembly further comprises an overmolded coil assembly that includes a coil portion and an arcuate wall portion, the coil portion projecting perpendicularly from the wall portion and the wall portion including a first compression-supplying surface and second compression-supplying surface. The arcuate wall portion compressively locks the plurality of arms to the pivot bearing cartridge with each of a plurality of spaced-apart portions of the first compression-supplying surface compressively abutting the first compression-receiving surface of each arm in the arm stack, and each of a plurality of spaced-apart portions of the second compression-supplying surface compressively abutting the second compression-receiving surface of each arm in the arm stack. The height of the arm stack is approximately equal to the limited height.

BRIEF DESCRIPTION OF THE DRAWINGS

FIG. 3 is a top view of a portion of an assembled rotary actuator arm arrangement of this invention without showing a pivot bearing cartridge.

FIG. 4 is a side view of a head disk assembly incorporating a portion of an assembled rotary actuator arm arrangement which shows the space advantages of this invention.

FIG. 5A–5B are flowcharts of alternative methods for assembling a head disk assembly of this invention.

DESCRIPTION OF PREFERRED EMBODIMENTS

Figure 1:
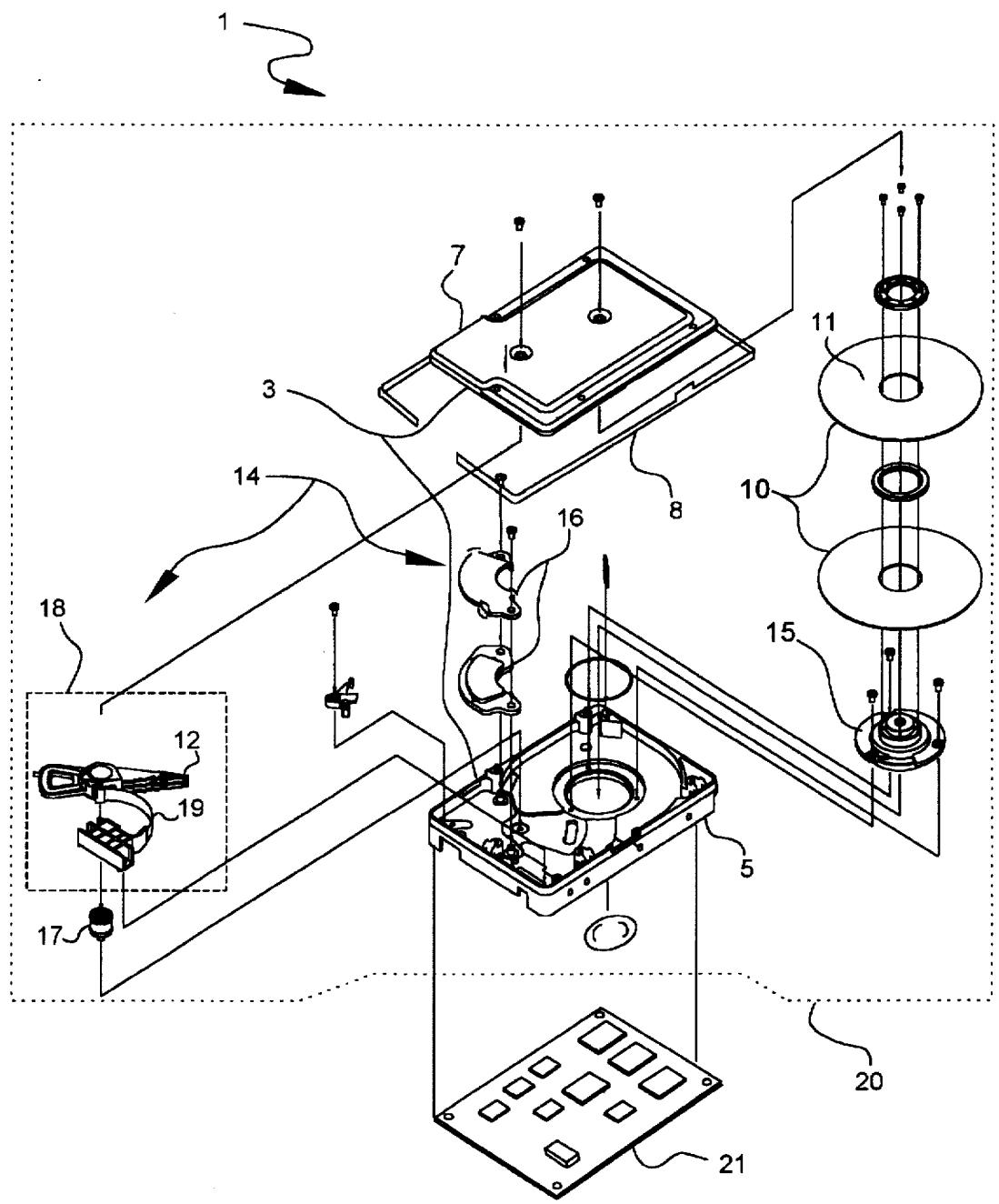
FIG. 1 is an exploded view of a disk drive incorporating an embodiment of this invention.

In FIG. 1, a disk drive 1 embodying this invention comprises an enclosure 3 comprising a base 5 and a cover 7. Enclosure 3 is sealed to provide a relatively contaminant-free interior for a head disk assembly (I-IDA) portion 20 of disk drive 1. Suitably, a tape seal 8 is used to seal enclosure 3. Disk drive 1 also includes a printed circuit board assembly 21 which contains the circuitry for processing signals and controlling operations of disk drive 1.

Within its interior, disk drive 1 includes a magnetic disk 10 having a recording surface 11, and includes a magnetic transducer 12. The particular embodiment shown in FIG. 1 includes two disks 10, providing four recording surfaces, and includes four magnetic transducers 12. Disk drive 1 further includes a rotary actuator arrangement generally indicated at 14. A spindle motor 15 causes each disk 10 to spin, preferably at a constant angular velocity.

Rotary actuator arrangement 14 provides for positioning magnetic transducer 12 over a selected area of recording surface 11 of disk 10. Rotary actuator arrangement 14 includes a permanent-magnet arrangement generally indicated at 16, a pivot bearing cartridge 17 and a head stack assembly 18. Pivot bearing cartridge 17 includes a stationary shaft secured to enclosure 3 to define an axis of rotation for rotary actuator arrangement 14. Head stack assembly 18 includes a flex circuit assembly 19 and a subassembly 18s shown in more detail in FIG. 2.

Figure 2:
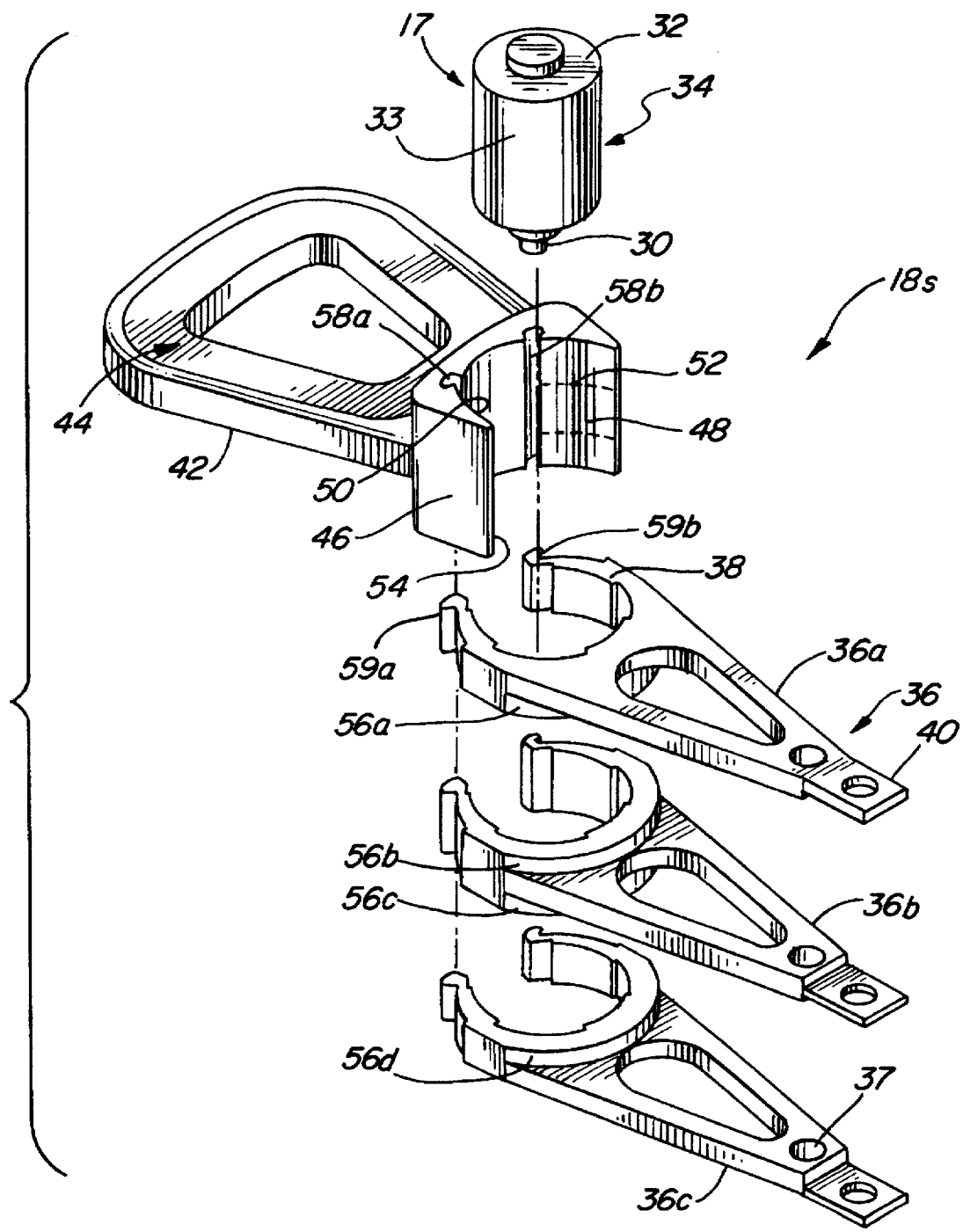
FIG. 2 is an exploded view of a portion of a rotary actuator arm arrangement of this invention.

In FIG. 2, subassembly, generally indicated by 18s, includes an overmolded coil assembly 42, and a arm stack generally indicated by 36 comprising a plurality of rotary actuator arms 36a–36c. Also shown is pivot bearing cartridge 17 which does not form a part of subassembly 18s. Overmolded coil assembly 42 is preferably made of plastic. Pivot bearing cartridge 17 includes a shaft 30 for defining an axis of revolution and an outer shell 32 that is rotatable about the shaft 30 and which includes a cylindrical surface 33. Pivot bearing cartridge 17 also includes an elongated portion 34. Overmolded coil assembly 42 includes a coil portion 44 and an arcuate wall portion 46. Coil portion 44 projects perpendicularly from wall portion 46, and wall portion 46 includes a first compression supplying surface 48 and a second compression supplying surface 50. First compression supplying surface 48 includes a plurality of spaced-apart portions, separated by dashed lines 52, and second compression supplying surface 50 includes a plurality of spaced-apart portions 54 (dashed lines not shown). Wall portion 46 also includes slots 58a and 58b which extend vertically along an inside surface of wall portion 46.

Arm stack 36 includes plurality of arms 36a–36c with each arm having a stacking portion 38 and a cantilever portion 40. Preferably, each arm is made from plastic. However, other materials, such as metal or a plastic arm coated with metal, can be used. Each stacking portion 38 also includes a spring element, described later, where the spring element includes end portions 59a and 59b. End portions 59a and 59b fit into slots 58a and 58b. Each arm includes an integral spacer portion 56a–56d which provides clearance between a pair of the arms, e.g., between arms 36a and 36b, of the arm stack 36. Using plastic arms and plastic overmolded coil assembly allows either the arms or the overmolded coil assembly to be the compliant material.

In an assembly process, pivot bearing cartridge 17 is placed on a tooling machine which includes a base plate and a rigid pin (not shown). Base plate is approximately 3 by 5 inches and ½ inch thick. Rigid pin also has a longitudinal axis which is parallel to a longitudinal axis of pivot bearing cartridge 17 and serves to align arms 36a–36c during the assembly process. Arm 36c is then pushed down onto pivot bearing cartridge 17 such that stacking portion 38 fits around pivot bearing cartridge 17 and rigid pin extends through a tooling hole 37. Arms 36b and 36a are then pushed down onto pivot bearing cartridge 17 in the same manner as arm 36c thereby forming arm stack 36. Next in the assembly process, overmolded coil assembly 42 is pushed down onto pivot bearing cartridge 17 and arm stack 36 by pinching in end portions 59a and 59b such that slots 58a and 58b slide through the end portions of each arm. Hence, arm stack 36, pivot bearing cartridge 17, and overmolded coil assembly 42 are now securely locked together. Alternatively, arms 36a–36c and overmolded coil assembly 42 can be interlocked first and then, pivot bearing cartridge 17 is pushed into a bore 68 (see FIG. 3) formed by interlocked arms 36a–36c and overmolded coil assembly 42.

Wall portion 46 compressively locks plurality of arms 36a–36c to pivot bearing cartridge 17 with each of plurality of spaced apart portions 52 of first compression supplying surface 48 compressively abutting first compression-receiving surface 64 of each arm in arm stack 36. Also, each of plurality of spaced apart portions 54 of second compression-supplying surface 50 compressively abuts second compression-receiving surface 66 of each arm in arm stack 36. Wall portion 46 also has a height approximately equal to a height of elongated portion 34 of pivot bearing cartridge 17 which will be described in more detail later.

In FIG. 3, arm 36a is shown locked or fitted to overmolded coil assembly 42. Stacking portion 38 of arm 36a includes a first spring element 60 and a second spring element 62. Since each arm is made from plastic, spring elements 60 and 62 are compliant. Spring elements 60 and 62 are positioned to define a generally C-shaped bearing surface, first spring element 60 including first compression-receiving surface 64 and second spring element 62 including second compression-receiving surface 66. Each C-shaped bearing surface contacts a portion of cylindrical surface 33. Each spring element includes a substantially L-shaped end portion 63 which fits into the slots of overmolded coil assembly 42. Also, bore 68 is formed when arms 36a–36c are locked to overmolded coil assembly 42.

In FIG. 4, head disk assembly 20 includes enclosure 3 having cover 7 and base 5. Enclosure 3 has an internal volume generally indicated by 84. Pivot beating cartridge 17 includes elongated portion, shown in dashed lines 34, and shaft 30 which is affixed to base 5 at a predetermined location 82. Internal volume 84 has a limited height 86 above predetermined location 82. Arm stack 36 has a height 85 which is approximately equal to limited height 86.

For example, for a given 3.5 inch drive having a 1 inch form factor, arm stack height 85 is preferably, approximately 0.670 inches, and the limited height is preferably, approximately 0.717 inches; moreover, a printed circuit board assembly would take up a portion of the 1 inch height in the 1 inch form factor disk drive. In other words, the height difference between limited height 86 and arm stack height 85 approaches the height difference, that typically exists, between a limited height of a given form factor disk drive and an arm stack height of a monolithic metal E-block arm stack within the given form factor disk drive. Elongated portion 34 is within internal volume 84 and has a height approximately equal to limited height 86.

Furthermore, a pair of arms, e.g., arms 36a and 36b, is separated by spacer portions 56a and 56b where the spacer portions 56a and 56b are integral to each arm 36a and 36b, respectively. Spacer portions 56a and 56b provide clearance for the pair of arms 36a and 36b. Also, each arm, e.g., arm 36a, includes a head gimbal assembly (HGA) 80 having one end 90 attached to cantilever portion of arm 36a and an opposite end 92 positioned adjacent to a recording surface.

Figure 5A:
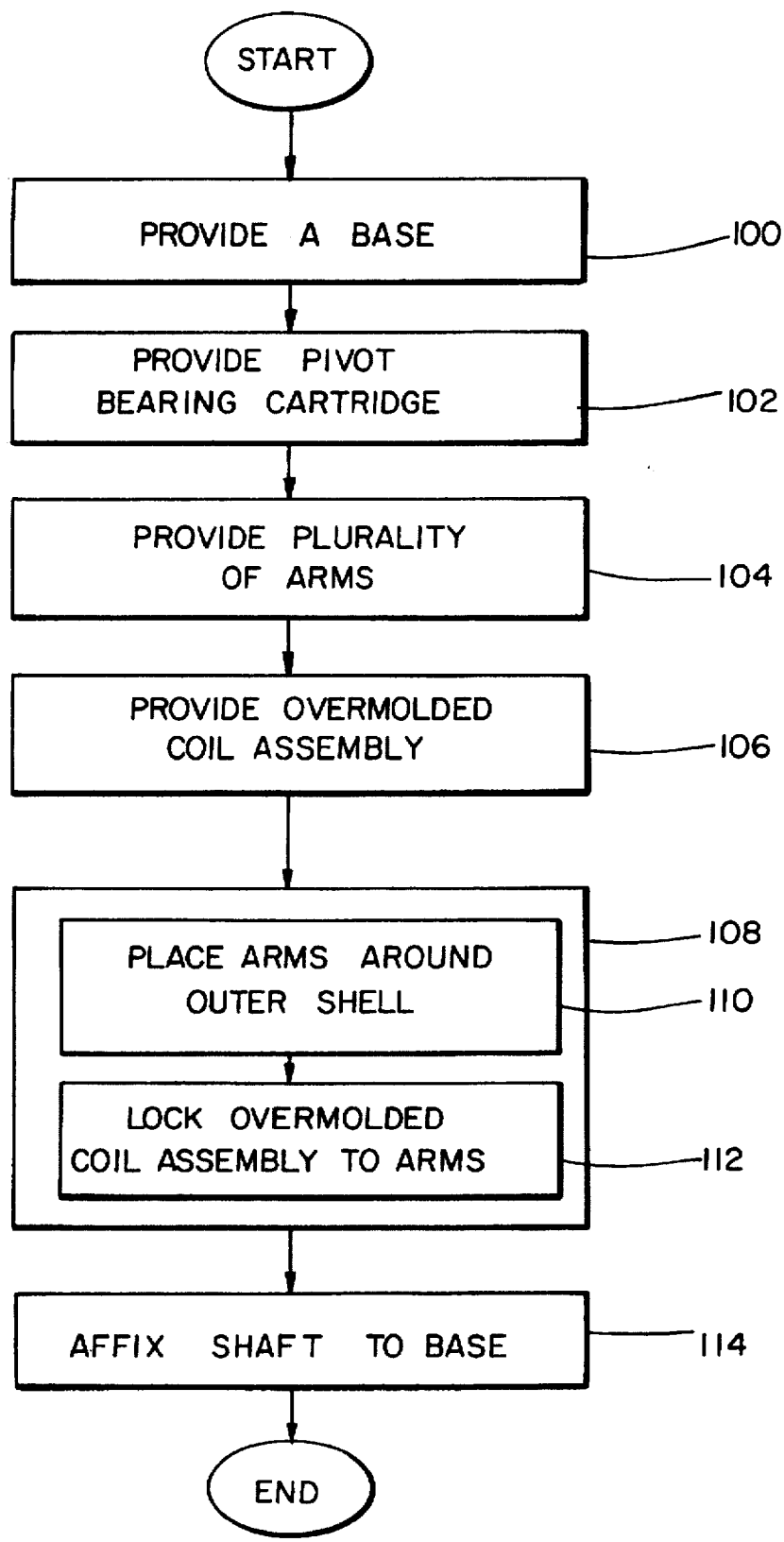

In FIG. 5A, base of head disk assembly is provided at 100. Pivot bearing cartridge is provided at 102. At 104, rotary actuator arms are provided. At 106, overmolded coil assembly is provided. Then, at 108, the interlocking step is shown which includes two substeps at 110 and 112. At 110, arms are placed around outer shell of pivot bearing cartridge, and at 112, overmolded coil assembly is locked to the arms by pinching in end portions of each arm and pushing down overmolded coil assembly such that end portions fit into the slots of arcuate wall portion of overmolded coil assembly. At 114, the shaft of the pivot bearing cartridge is affixed to the base.

In FIG. 5B, an alternative method for assembling a head disk assembly is shown. Base of head disk assembly is provided at 200. Pivot bearing cartridge is provided at 202. At 204, rotary actuator arms are provided, and at 206, overmolded coil assembly is provided. At 208, the interlocking step includes locking each arm to overmolded coil assembly by pinching in end portions of each arm and pushing the arm down the slots inside arcuate wall portion of overmolded coil assembly. At 210, outer shell of pivot bearing cartridge is fitted into a bore which was formed due to interlocking step at 208. Then, at 212, the shaft of the pivot bearing cartridge is affixed to the base. Of course, prior to step 114 in FIG. 5A and step 212 in FIG. 5B, other components, such as a head gimbal assembly, are attached to each arm to form a head stack assembly within the head disk assembly.

Therefore, according to this invention, significant space advantages are obtained while using stackable arms and a plastic overmolded coil assembly. As shown in FIG. 4, the topmost part of top arm 36a is at the same level as the topmost part of wall portion 46. Also, the bottommost part of bottom arm 36c is at the same level as the bottommost part of wall portion 46. Height 85 of arm stack 36 is approximately equal to limited height 86 within head disk assembly 20. Hence, the height of a head disk assembly is reduced or alternatively, additional arms cab be assembled such that a corresponding number of additional disks can be used in a given head disk assembly.

We claim:

1. A head disk assembly comprising:

a base;

a pivot bearing cartridge having a shaft for defining an axis of revolution, and having an outer shell that is rotatable about the shaft, the outer shell having a cylindrical surface, the shaft being affixed to the base;

an arm stack comprising a plurality of arms, each arm having a stacking portion, each stacking portion including a first spring element and a second spring element, the spring elements being positioned to define a generally C-shaped bearing surface, the first spring element including a first compression-receiving surface and the second spring element including a second compression-receiving surface, each C-shaped bearing surface contacting a portion of the cylindrical surface;

an overmolded coil assembly that includes a coil portion and an arcuate wall portion, the coil portion projecting perpendicularly from the wall portion and the wall portion including a first compression-supplying surface and second compression-supplying surface;

the arcuate wall portion compressively locking the plurality of arms to the pivot bearing cartridge with each of a plurality of spaced-apart portions of the first compression-supplying surface compressively abutting the first compression-receiving surface of each arm in the arm stack, and each of a plurality of spaced-apart portions of the second compression-supplying surface compressively abutting the second compression-receiving surface of each arm in the arm stack.

2. The head disk assembly of claim 1 wherein the height of the arcuate wall portion is approximately equal to the height of the arm stack.

3. The head disk assembly of claim 1 wherein at least one of the arms includes an integral spacer portion to provide clearance between a pair of the arms of the arm stack.

4. The head disk assembly of claim 1 wherein each of the arms is plastic.

5. The head disk assembly of claim 1 wherein the height of the arm stack is approximately equal to a limited height within the head disk assembly.

6. The head disk assembly of claim 1 wherein the wall portion includes a slot extending vertically inside along the wall portion.

7. The head disk assembly of claim 6 wherein the first spring element includes an end portion which fits into the slot.

8. The head disk assembly of claim 7 wherein the end portion is substantially L-shaped.

9. The head disk assembly of claim 2 wherein the height of the arcuate wall portion is equal to the height of the arm stack.

10. A head disk assembly comprising:

an enclosure including a base and a cover;

a pivot bearing cartridge having a shaft for defining an axis of revolution, and having an outer shell that is rotatable about the shaft, the outer shell having a cylindrical surface, the shaft being affixed to the base at a predetermined location;

the enclosure having an internal volume with a limited height above the predetermined location; the pivot bearing cartridge having an elongated portion in the volume;

a plurality of disks, each disk having at least one recording surface;

means for rotating the disks;

an arm stack comprising a plurality of arms, each arm having a stacking portion and a cantilever portion;

each stacking portion including a first spring element and a second spring element, the spring elements being positioned to define a generally C-shaped bearing surface, the first spring element including a first compression-receiving surface and the second spring element including a second compression-receiving surface, each C-shaped bearing surface contacting a portion of the cylindrical surface;

an overmolded coil assembly that includes a coil portion and an arcuate wall portion, the coil portion projecting perpendicularly from the wall portion and the wall portion including a first compression-supplying surface and second compression-supplying surface;

the arcuate wall portion compressively locking the plurality of arms to the pivot bearing cartridge with each of a plurality of spaced-apart portions of the first compression-supplying surface compressively abutting the first compression-receiving surface of each arm in the arm stack, and each of a plurality of spaced-apart portions of the second compression-supplying surface compressively abutting the second compression-receiving surface of each arm in the arm stack; and the height of the arm stack is approximately equal to the limited height.

11. The head disk assembly of claim 10 wherein the wall portion includes a slot extending vertically inside along the wall portion.

12. The head disk assembly of claim 11 wherein the first spring element includes a substantially L-shaped end portion which fits into the slot.

* * * * *